United States Patent [19]

Small

[11] Patent Number: 5,491,402
[45] Date of Patent: *Feb. 13, 1996

[54] APPARATUS AND METHOD FOR PROVIDING AC ISOLATION WHILE SUPPLYING DC POWER

[75] Inventor: Kenneth T. Small, Cupertino, Calif.

[73] Assignee: Echelon Corporation, Palo Alto, Calif.

[ * ] Notice: The term of this patent shall not extend beyond the expiration date of Pat. No. 5,391,932.

[21] Appl. No.: 94,459

[22] Filed: Jul. 20, 1993

[51] Int. Cl.$^6$ .............................. G05F 1/40; H04M 11/04
[52] U.S. Cl. .................. 323/282; 340/310.08; 307/125; 363/80
[58] Field of Search ................ 323/282; 370/94.1; 380/9, 21; 333/116, 204; 179/2 EB; 307/125; 363/78, 79, 80; 340/310.8; 361/84; 327/594

[56] References Cited

U.S. PATENT DOCUMENTS

| | | | |
|---|---|---|---|
| 4,211,894 | 7/1980 | Watanabe et al. | 370/57 |
| 4,631,491 | 12/1986 | Smithers | 330/149 |
| 4,969,147 | 11/1990 | Markkula, Jr. et al. | 370/94.1 |
| 5,212,815 | 5/1993 | Schumacher | 455/126 |
| 5,228,083 | 7/1993 | Lozowick et al. | 380/9 |
| 5,391,932 | 2/1995 | Small et al. | 307/125 |

*Primary Examiner*—Peter S. Wong
*Assistant Examiner*—Adolf Berhane
*Attorney, Agent, or Firm*—Blakely, Sokoloff, Taylor & Zafman

[57] ABSTRACT

A source power coupler for coupling a power source to a first transmission line and a second transmission line. DC power from the power source is conducted by the source power coupler to the first and the second transmission lines while AC signals on the first and the second transmission lines are isolated from the power source by the source power coupler. The source power coupler is comprised of an operational amplifier having a non-inverting input and an inverting input. The gate of a transistor is coupled to an output of the operational amplifier. The transistor's drain is coupled to one of the transmission lines. And the transistor's source is coupled to the inverting input of the op-amp. Thereby, a control loop is formed, which provides an AC impedance between the power source and one of the transmission lines. A resistor is coupled between the source of the transistor and the power source, and a capacitor is coupled between the non-inverting input of the op-amp and the power source. Another resistor is coupled between the non-inverting input of the op-amp one of the transmission lines. The capacitor and the second resistor provide a second control loop. This control loop provides a constant direct current voltage across the transistor.

13 Claims, 5 Drawing Sheets

APPARATUS AND METHOD FOR PROVIDING AC ISOLATION WHILE SUPPLYING DC POWER

FIELD OF THE INVENTION

The present invention pertains to the field of interface devices which are implemented between power sources and communication lines. More specifically, the present invention is related to an apparatus and method of providing isolation at relatively high frequencies while passing direct current power to cells along the communication lines.

BACKGROUND OF THE INVENTION

There are a number of commercially available products which provide sensing, control, and communications in a network environment. These products range from elaborate systems having a large amount of intelligence to simple systems having little intelligence. By way of example, such a system may provide control between a light switch and a light. When the light switch is operated, a digital code pattern is transmitted by one cell and is received by another cell located near the light. When the code is received, it is interpreted and subsequently used to control the light. Such a system, comprising a network of intelligent cells in which the cells communicate, control and sense information, is described in U.S. patent entitled, "Network and Intelligent Cell for Providing Sensing, Bidirectional Communications and Control", U.S. Pat. No. 4,969,147, issued Nov. 6, 1990, which is assigned to the assignee of the present invention.

The transmitting and receiving of digital data can be performed by a series of transceivers, each of which is connected to an individual cell of a network. These transceivers may communicate with one another in numerous different ways over various media and at many different baud rates. For example, the transceivers could be connected to standard communications lines, such as twisted pair lines, fiber optic cables, and coaxial cables. Indeed, even power lines have been employed as a transmission medium by implementing spread spectrum techniques.

In order to minimize costs, the same transmission lines coupling the various cells can be used to provide a medium for the transmission of data between the cells as well as for supplying power to the cells. In this scheme, duplicate communications lines and power lines are not required. Instead, a single set of transmission lines perform the dual functions of conveying power and data amongst the cells. This optimization can be realized by interposing a source power isolator between the power source and the cells. The source power isolator provides isolation for the relatively high data frequencies while also passing direct current (DC) on transmission lines for powering the cells. In the prior art, source power isolators were typically comprised of a pair of inductors.

FIG. 1 shows a typical prior art source power isolator 101. The source power isolator 101 is comprised of two inductors 102 and 103, which provide the necessary impedance for isolation at the high data frequencies. This impedance must be made relatively high. Otherwise, the data signals generated by the cells 106–108 will fail to create an adequate voltage across the transmission lines 104 and 105. Furthermore, high impedance is needed for loading the transmission lines 104 and 105 with its characteristic impedance (e.g., 50 to 300 ohms).

There are numerous problems associated with these prior art source power isolators. Several of the problems are attributable to the flaws inherent to inductors. First, inductors alone do not provide a controllable DC impedance. For certain power supplies (e.g., switching-power supplies), it is desirable to have a controllable DC impedance during power-up of the communications network. This is because the negative resistance resulting from constant cell power and/or the total effective capacitance that must be charged at system power-up might result in the activation of the source power supply's internal protection circuitry. In turn, this might result in a continuous retry to start, a hang-up on the "foldback" curve, or a failure of the source power supply.

Second, inductors alone cannot provide a voltage drop, as might be required, to drop from a common source voltage (e.g., +48 volts) to below a safety limit (e.g., +42.4 volts). Third, dangerous and damaging overvoltage transients are sometimes created during accidental or momentary disruptions in the transmission line circuit. Consequently, additional safeguarding measures are often required. And fourth, short circuits across the transmission lines and from a transmission line to ground, necessitates other safeguarding measures. Simple inductors cannot limit these overcurrent conditions Another problem with typical prior art source power isolators is that safety agencies, such as Underwriters Laboratories (UL), may require "single fault tolerance" for protection against overvoltage output situations. Furthermore, as the data rates drop and as DC line currents increase, larger and more expensive source power isolators are required.

Therefore, there is a need in the prior art for a protected source power isolator which provides a constant start-up current at the rated capacity of the system or power source and whose output voltage is limited to fall within safety guidelines. It would be preferable if such an isolator had a delay to allow time for the source power supply to reach full output voltage during system power-up. It would also be preferable if the isolator could preclude power source retry, hang-up, or other failures.

SUMMARY OF THE INVENTION

The present invention pertains to a solid state source power coupler. In the present invention, source power isolators are used in place of inductors. Similar to inductors, the source power isolators' alternating current (AC) impedance increases with the data frequency. A non-faulted source power isolator is used as a single fault tolerant voltage limiter.

Furthermore, one or more of the following protection circuits are provided. These protection circuits include a duty cycle dissipation and foldback current limiter for protecting the source power isolator. Also included is a burp current limiter in the source power isolator impedance to protect against damage in case of a short in one of the transmission lines to ground. A reverse voltage circuit is used to protect against accidental line reversal connections. A circuit for controlling the voltage drop is implemented to limit the maximum output voltage to a safe range.

In one embodiment, a constant start-up current at the rated capacity of the system or the power source is provided. Moreover, a delay circuit allows time for the source power supply to reach full output voltage during system power-up. An undervoltage lockout circuit is implemented to preclude power source hang-up by reactivating the power start-up sequence if the input voltage falls below approximately two-thirds of the nominal input voltage. Furthermore, a means for synchronizing the start sequence of multiple source power isolators is provided.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A solid state source power coupler is described. In the following description, for purposes of explanation, numerous specific details are set forth, such as component values, frequencies, voltages, impedances, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
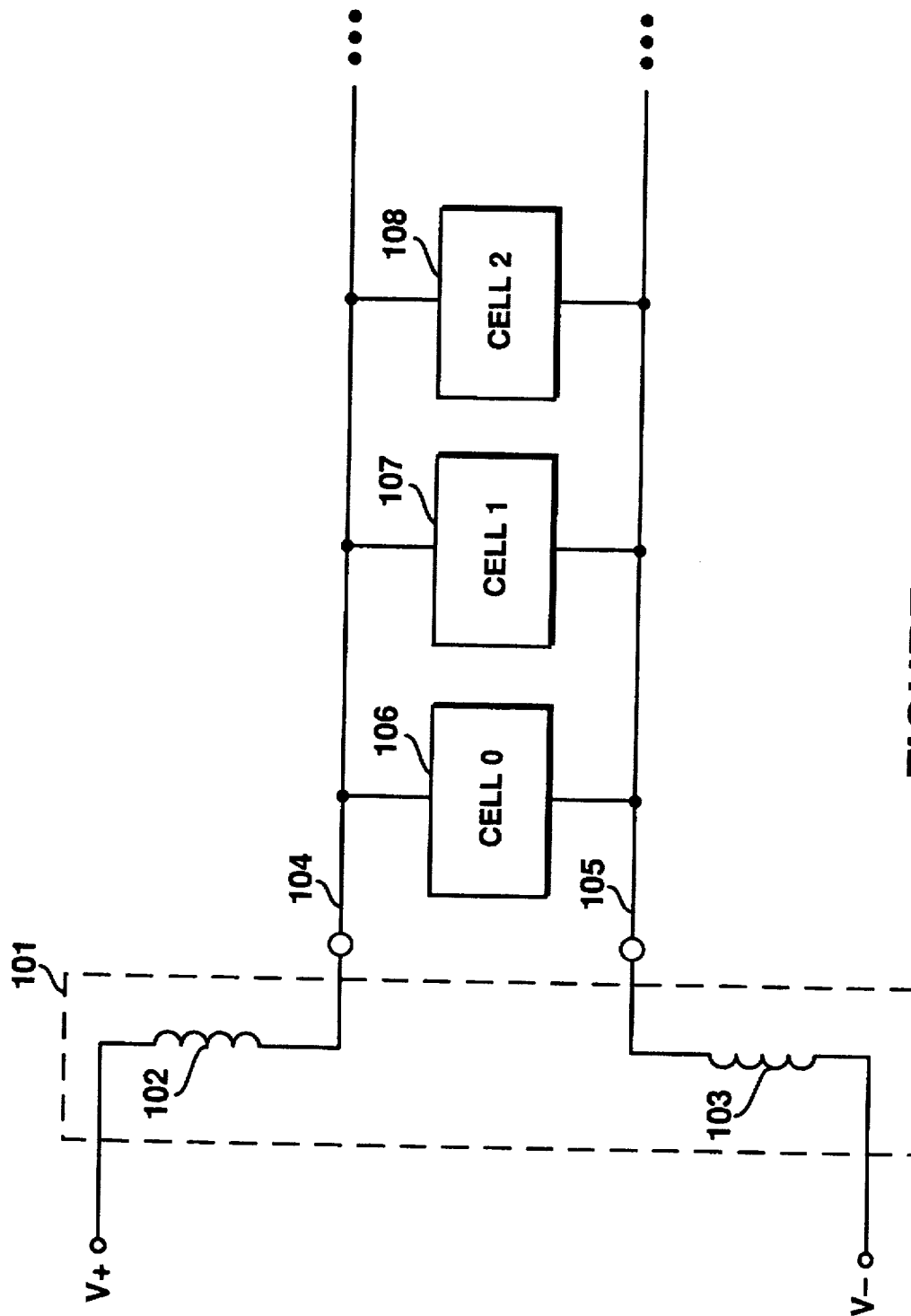
FIG. 1 is a block diagram showing a typical prior art source power isolator for applying DC power to transmission lines.
Figure 2:
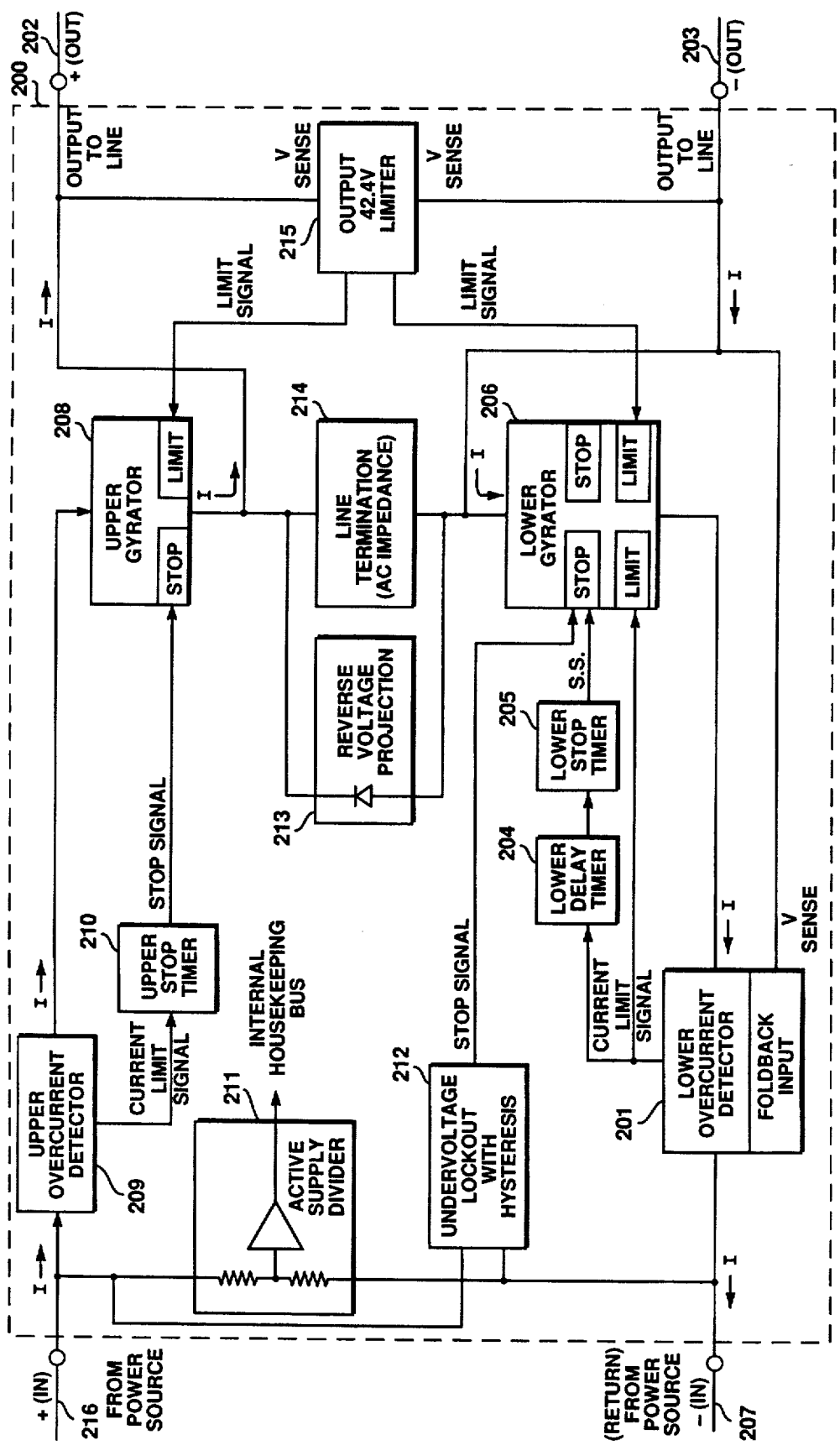
FIG. 2 is a block diagram showing the currently preferred embodiment of the source power isolator of the present invention.

Referring to FIG. 2, a block diagram of the currently preferred embodiment of the present invention is shown. It can be seen that the source power coupler is coupled between the two lines 216 and 207 from the power source and the output lines 202 and 203 to the cells. Line 216 is the positive input from the power source, and line 207 is the negative return from the power source. Lines 202 and 203 are the transmission lines for coupling the cells of the network. Both power and data signals are conducted over lines 202 and 203. The four lines 2 16, 207,202, and 203 can include any pair of wires, such as shielded twisted pairs, unshielded twisted pairs, quad pairs, untwisted pairs, and even two coaxial cables.

The source power coupler 200 is comprised of a lower overcurrent detector 201. The lower overcurrent detector 201 is used to prevent excessive output currents during start-up when capacitances on the transmission lines 202 and 203 are being charged. In addition, the lower overcurrent detector 201 prevents excessive output currents whenever an overload or short circuit across the transmission lines 202 and 203 occurs.

Once the lower overcurrent detector is triggered, the output current is limited until the lower delay timer 204 times out (approximately 0.7 seconds). This provides sufficient time for the capacitors in the cells across the transmission lines 202 and 203 to be charged up. After approximately 0.7 seconds, the lower stop timer 205 is activated. Thereupon, the lower source power isolator 206 is turned off for approximately seven seconds. Hence, this results in a duty cycle of approximately 10%.

In the present invention, the seven second delay occurs each time the source power coupler is powered-up, thereby providing enough time for the power source to reach full output voltage. Consequently, the possibility of accidentally tripping the power source's overcurrent protection mechanism is minimized.

For some applications, such as when the power is derived from a grounded power supply, the grounding of either input line is normal. However, if either output line becomes accidentally grounded with a grounded power supply, then an overcurrent condition may exist. For example, if lines 216 and 202 become grounded, there is no problem with overcurrent. Similarly, if lines 203 and 207 become grounded, there is no problem with overcurrent (except possibly at start-up). However, if lines 216 and 203 accidentally become grounded, then the lower overcurrent protection is triggered. Likewise, if lines 207 and 202 become grounded, the upper overcurrent protection is triggered.

The upper overcurrent detector 209 detects this condition. Upper overcurrent detector 209 is set to detect currents greater than approximately three amperes. Upon detecting currents exceeding three amperes, the upper overcurrent detector generates a current limit signal which is input to the upper stop timer 210. When the upper stop timer receives a current limit signal, it sends a stop signal to the upper source power isolator 208. The stop signal turns off the upper source power isolator 208 in less than 0.001 second and keeps it off for approximately 0.1 second. As a result, a 1% duty cycle is achieved.

The active supply divider 211 is used to provide a voltage for powering the internal op-amps at half of the input voltage. Since the input voltage is +48 volts, the active supply divider 211 provides a +24 volts output onto an internal housekeeping bus. The +24 volts is used to power the semiconductor devices inside the power source coupler.

The undervoltage lockout with hysteresis block 212 prevents the source power coupler from operating when the input voltage is below approximately thirty volts. This insures sufficient voltage on all circuitry during operation. This also prevents loss of control which might damage the source power isolators' transistors by excessive power dissipation. Approximately five volts of hysteresis is provided to insure an abrupt (i.e., clean) snap-on and snap-off of the source power isolator, hereinafter referred to as SPI, during power-up and power-down routines. This precludes the possibility of a power source comprising of a linear power supply which utilizes foldback current limiting, from "hanging up" in foldback at the SPI undervoltage lockout point.

The reverse voltage protection block 213 is comprised of a three ampere diode. Its function is to provide reverse voltage protection in case of accidental reversed connections to one of the transmission lines.

The line termination block 214 is used to provide a constant differential termination impedance over the usable signal frequency range. This minimizes signal reflections from the end of an otherwise unterminated transmission line. Furthermore, it also minimizes the distortion of signal waveforms. Moreover, since the signal sources in the cells along the transmission line usually utilize current source outputs, an appropriate damping impedance (e.g., 50 ohms), prevents voltage clipping at the current source outputs from an otherwise unterminated line.

In applications wherein two or more SPIs are used together for additional power capability, it is important that both SPIs power-up the transmission line at the same time in order to avoid the possibility of a "hang-up" problem and continuous "burp" shutdowns. A "burp" refers to the activation of a current limiter. The upper source power isolator requires approximately 0.001 seconds to trip and "burp". The lower source power isolator requires approximately 0.7 seconds to trip and "burp". The term "hang-up" refers to a repeating series of "burp" overcurrent shutdowns, such as a failure to startup the communications line power. For example, if the line requires 1.5 amperes and each source power isolator can deliver 1.0 amperes without "burping", then they both must startup at the same time to provide a 2.0 ampere burp-free capability. This requires synchronization.

In the currently preferred embodiment of the present invention, certain safety guidelines are followed. For example, UL 864, 1076, 916, and 508 specify that no more than 42.4 volts DC should be applied across the transmission line under most operating conditions. In addition, this 42.4 volt limit should not be exceeded even with a single point failure (i.e., a single short or open in any single component) in the SPI. These safety precautions are provided by the output 42.4 volt limiter block 215. When the output voltage exceeds 42.4 volts, block 215 generates and sends a limit signal to the upper and lower source power isolators 208 and 206. Thereupon, the voltage dropped by the upper and lower source power isolators 208 and 206 is increased to maintain the output voltage below 42.4 volts. Consequently, any component in the SPI can be opened or shorted (i.e., a single point failure) without the power source coupler providing output of more than 42.4 volts.

Figure 3A:
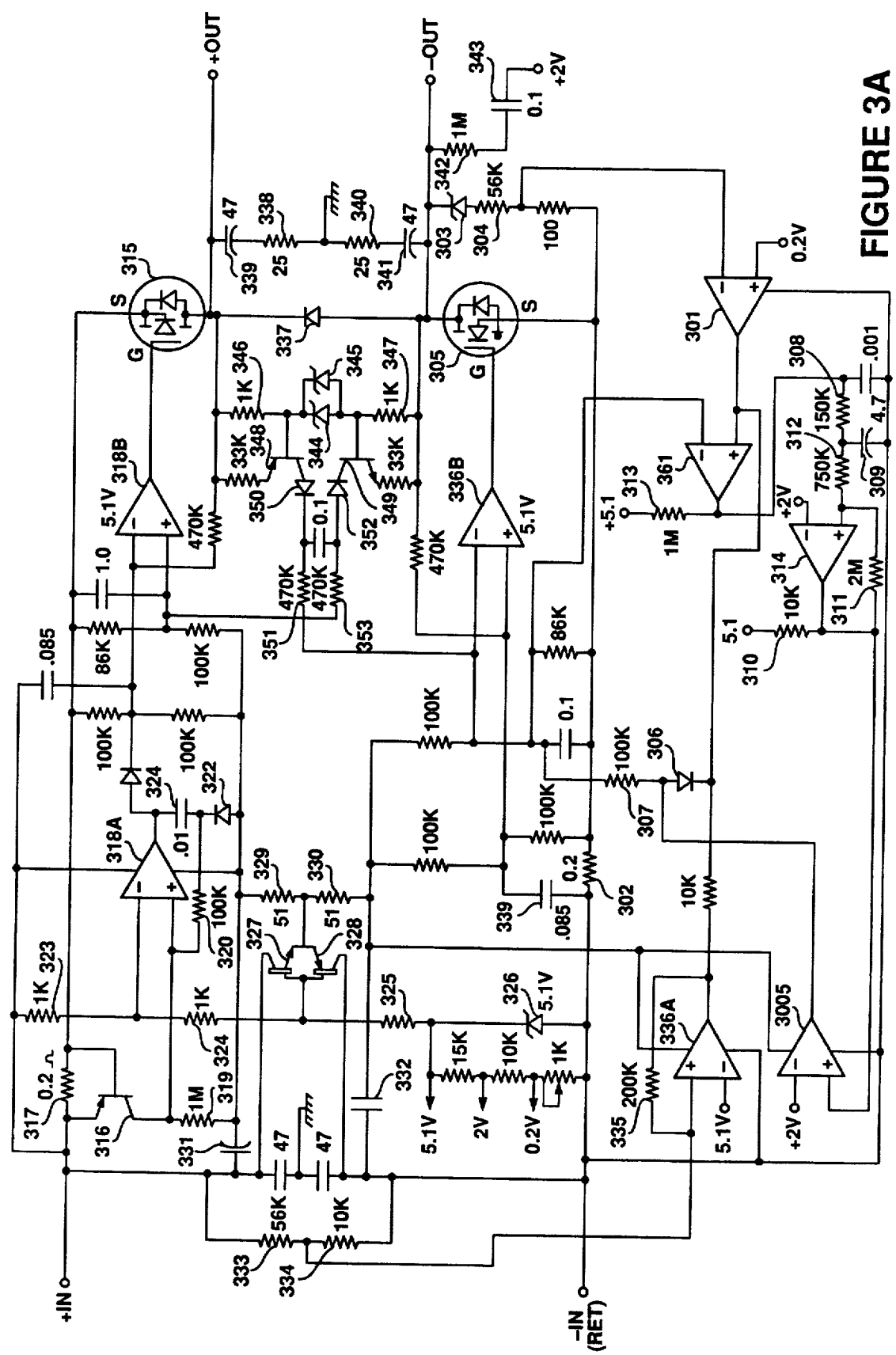
FIG. 3A is a detailed circuit diagram of the currently preferred embodiment of the source power isolator of the present invention.

FIG. 3A is a detailed circuit diagram of the currently preferred embodiment of the source power coupler. It can be seen that the lower overcurrent detector is comprised of an open collector, voltage comparator 301, which detects a one ampere current limit point by sensing a 0.2 volt drop across resistor 302. Comparator 301 is part of a quad comparator package which also includes comparators 301,314, and 3005. The 10V zener diode 303 and resistor 304 provide foldback current limiting which minimizes the power dissipation in transistor 305. Furthermore, comparator 301 draws current through diode 306 and resistor 307 to minimize the current flowing through the lower source power isolator. This current limit action continues until the lower delay timer times out as determined by the RC time constant of resistor 308 and capacitor 309. Afterwards, the lower stop timer comprised of capacitor 309 and resistors 308 and 310-313 is activated and completely turns off the lower source power isolator for approximately seven seconds. This produces a 10% duty cycle and also limits the power dissipation in transistor 305 to a non-destructive value.

The upper overcurrent detector is set to detect currents above three amperes. It is comprised of transistor 316 and resistor 317. The current limit signal activates the upper stop timer comprised of op-amp 318, resistors 319 and 320, capacitor 324, and diode 322.

The active voltage supply divider is comprised of diode 326, transistors 327-328, and resistors 323-325 and 329-330. Noise filtering is provided by resistor 329 and capacitor 331. Additional filtering is provided by resistor 330 and capacitor 332. These filters minimize the internal power supply bus noise and enhances the common mode power supply rejection capability to improve the high frequency impedance of the upper and lower source power isolators.

It can be seen that the input undervoltage lockout and hysteresis function is implemented by resistors 333–335 and op-amp 336. This prevents the SPI from operating when the input voltage is less than approximately thirty volts. Hence, sufficient voltage is supplied to the various circuits, while preventing loss of control which might damage the source power isolator transistors 305 and 3 15 from excessive power dissipation. Furthermore, the diode 337 is used to provide reverse voltage protection to protect transistors 305 and 315 against accidental reversed connections to a transmission line, which would otherwise cause a voltage breakdown in those transistors.

Referring to FIG. 3A, it can be seen that the resistors 338 and 340 and the capacitors 339 and 341 provide a constant differential termination impedance over the usable signal frequency range. Note that the common mode (i.e., the output lines to earth ground) impedance is low because resistors 338 and 340 are in parallel. This 12.5 ohm common mode impedance helps prevent common mode noise currents from reducing the voltage across transistors 305 and 315. If the voltage across transistors 305 and 3 15 becomes too small, the impedance across it will diminish and reduce the AC signal on that transmission line.

In applications where two or more SPIs are used together, the synchronization function for ensuring that both SPIs power up the transmission line at the same time, is provided by resistor 342 and capacitor 343. When one SPI turns on, the voltage on the negative output line of the other SPI falls and couples an AC signal through resistor 342 and capacitor 343 onto the two volt internal bus. In turn, this reduces the threshold voltage at comparator 314, thereby permitting an earlier, synchronized turn on of the SPI.

In order to ensure that no more than 42.4 volts DC is ever applied across the transmission lines, diodes 344–345 are implemented. When the output voltage exceeds 42.4 volts, diodes 344–345 are turned on, causing a voltage drop across resistors 346–347. This voltage activates the current sources provided by transistors 348–349. As a result, current is caused to flow through diode 350 and resistor 351 into the lower source power isolator and also through diode 352 and resistor 353 from the upper source power isolator. These currents increase the voltage dropped by each source power isolator enough to maintain the output voltage below 42.4 volts.

In the present invention, any single point failure will not cause the output voltage to exceed 42.4 volts. At worst case, either the upper source power isolator and transistor 349 or the lower source power isolator and transistor 348 will remain functional. In either case, the output voltage is limited.

Figure 3B:
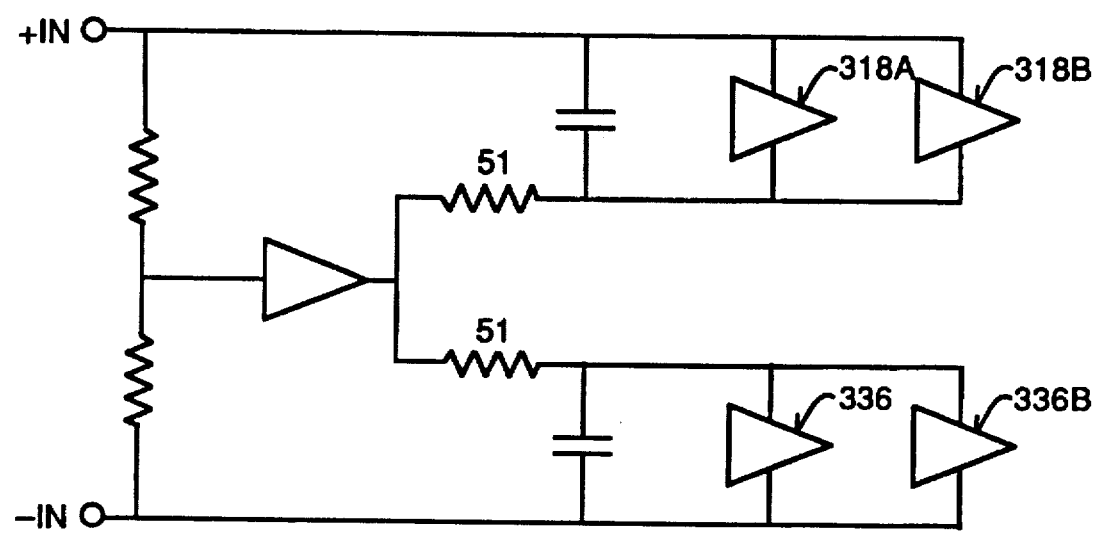
FIG. 3B is a circuit diagram showing a voltage divider for supplying power to the op-amps.

FIG. 3B is a circuit diagram of the voltage divider for supplying power to the op-amps. It can be seen that the voltage across the +IN and −IN lines is divided and fed to the dual op-amps 318A–318B and 336A–336B.

Figure 4:
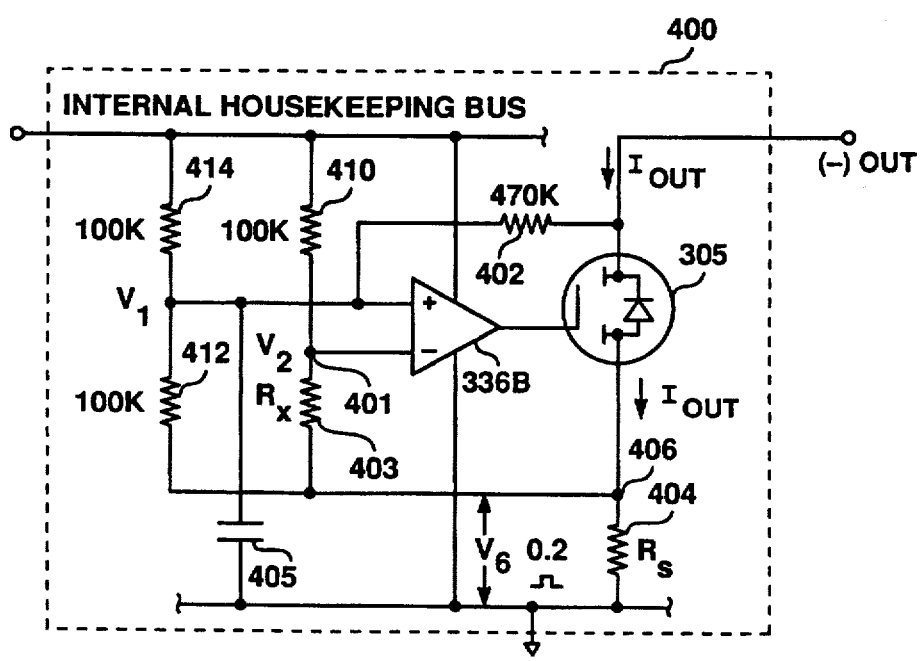
FIG. 4 is a detailed circuit diagram of the lower source power isolator and the relevant components for establishing the DC operating point.

FIG. 4 is a circuit diagram of the lower source power isolator and the relevant components for establishing the DC operating point. Given that the internal housekeeping bus is at 24 volts, the following calculations are used to determine the value for $R_x$ in order to develop a three volt DC drop across transistor 305:

$$V_1 \cong V_2$$

$$V2 = (24)[R_x/(R_x + 100K)]$$

$$I(node\ 401) = 0 = [(24-V_1)/100K] - [V_1/100K - [(V_1-3V)/470K]]$$

$V_1=11.135V=V2$ $11.135V=24[Rx/(Rx+100K)]$ $R_x=86.6Kohm$

The source power isolator 400, having an impedance Z(f) as a function of frequency, is comprised of opoamp 336B, transistor 305, resistors 402–403 and 410–412, and capacitor 405. The output of op-amp 360 is coupled to the gate of transistor 305. The drain of transistor 305 is coupled to the negative output transmission line, and the source of transistor 305 is coupled to a sense resistor 404. The other end of sense resistor 404 is coupled to either ground or the power source. The inverting input of op-amp 336B is coupled to the junction 406 of the source of transistor 305 and sense resistor 404. This forms a control loop to provide a high AC impedance between the power source and the transmission line. Hence, the lower source power isolator has an impedance Z(f) which is a function of frequency.

The non-inverting input of op-amp 336B is coupled to a voltage feedback resistor 402 and a capacitor 405. The other end of feedback resistor 402 is coupled to the transmission line, while the other end of capacitor 405 is coupled to the power source. This forms a constant DC voltage control loop, which maintains a nearly constant DC voltage across transistor 305. The offset voltage developed because resistor 403 is not 100K ohms as are resistors 410–412, provides an offset voltage between either the inverting or non-inverting input of op-amp 336B This sets the quiescent DC voltage across the transistor 305.

The upper source power isolator is comprised of the same components as the lower source power isolator as described in detail above. It should be noted that transistors 305 and 315 can be either field effect transistors or bipolar transistors. For bipolar transistor embodiments, the gate corresponds to the base; the drain corresponds to the collector; and the source corresponds to the emitter.

Figure 5:
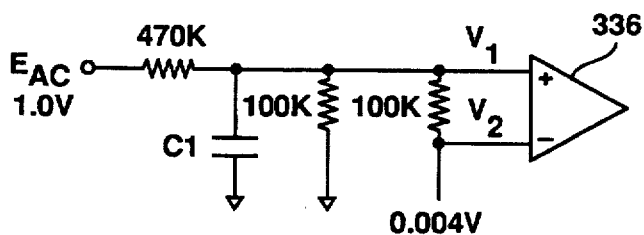
FIG. 5 is a detailed circuit diagram of the lower source power isolator and the relevant components for establishing the AC operating point.

FIG. 5 is a circuit diagram of the lower source power isolator and the relevant components for establishing the AC impedance. In the present invention, the value of C1 is calculated to achieve a relatively high AC impedance (e.g., $Z_{AC}=X_L=50$ ohms). This prevents excessive loading of the transmission line to ground at the lowest data frequency (e.g., 1.0 KHz). The value of C1 is calculated as follows:

$V_1 \cong V_2$ $Z_{AC}=E_{AC}/I_{AC}$

Set $E_{AC}=1.0$ volts $I_{AC}=E_{AC}/Z_{AC}= 1/50=0.02$ amperes $V_2=I_{AC}R_S=0.02(0.2)=0.004$ volts $0.004$ volts=$1.0$ volt $[X_{c1}/(X_{c1}+470K)]$ $Xc1 \ll 470K$ $0.004$ volts= $1.0$ volt $(X_{c1}/470K)$ $X_{c1}= 1880$ ohms at $1.0$ KHz $C_1=1/(2\pi f X_{c1})=0.085$ microfarads Note that the effect of R2 is negligible because it is coupled across op-amp 336B. Consequently, R2 has virtually zero volts across it.

It should also be noted that the upper source power isolator is essentially a mirror image of the lower source power isolator. Hence, it has identical corresponding components, and both of the source power isolators have nearly the same electrical performance.

Figure 6:
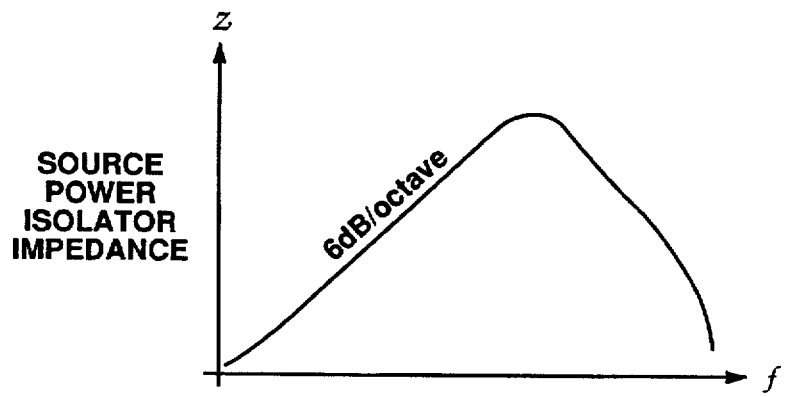
FIG. 6 is a plot showing the impedance of the lower and upper source power isolator as a function of frequency.

FIG. 6 is a plot showing the source power coupler's impedance as a function of frequency. It can be seen that the power source coupler's impedance increases at six decibels per octave of frequency until a maximum impedance is attained. At higher frequencies, the source power couples impedance starts to fall off. This happens because, the high-frequency gain for op-amps 318B and 336B and transistors 305 and 3 15 starts falling off at the higher frequencies, thereby resulting in a drop In the foregoing specification, the invention has been described with reference to specific exemplary embodiment thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

Thus, a source power coupler is disclosed.

What is claimed is:

1. In a communications network having a plurality of processors coupled by a first transmission line and a second transmission line, a method for interfacing a power source to said first transmission line and said second transmission line, wherein direct current power from said power source is conducted by said source power coupler to said first and said second transmission lines while alternating current on said first and said second transmission lines is isolated from said power source by said source power coupler, said method comprising the steps of:

implementing an operational amplifier having a non-inverting input and an inverting input;

coupling a transistor to an output of said operational amplifier;

regulating an alternating current impedance between said power source and said one of said transmission lines;

maintaining an approximately constant direct current voltage across said transistor by coupling a capacitor between said non-inverting input of said operational amplifier and said power source and coupling a first resistor between said non-inverting input of said operational amplifier and said one of said transmission lines.

2. The method of claim 1 further comprising the step of generating an offset voltage associated with either said non-inverting or said inverting input of said operational amplifier for setting a quiescent direct current voltage across said transistor.

3. The method of claim 2 further comprising the step of providing a constant startup current.

4. The method of claim 3 further comprising the step of limiting a duty cycle of a constant start-up current.

5. The method of claim 4 further comprising the step of limiting a current to a foldback curve shape.

6. The method of claim 5 further comprising the step of generating a delay to allow said power source to attain full output voltage during power-up.

7. The method of claim 6 further comprising the step of safeguarding said source power coupler when one of said transmission lines is short circuited to ground.

8. The method of claim 7 further comprising the step of reactivating a power startup sequence if an input voltage falls substantially below a normal input voltage level.

9. The method of claim 8 further comprising the step of synchronizing power startup sequences associated with a plurality of source power couplers.

10. A source power coupler for coupling a power source to a first transmission line and a second transmission line, wherein direct current power from said power source in conducted by said source power coupler to said first and said second transmission lines while alternating current on said first and said second transmission lines is isolated from said power source by said source power coupler, said source power coupler comprising:

a first operational amplifier having a non-inverting input and an inverting input;

a transistor coupled to an output of said first operational amplifier, and a source coupled to said inverting input of said first operational amplifier, for providing a first control loop that establishes an alternating current impedance between said power source and said one of said transmission lines;

a capacitor coupled between said non-inverting input of said operational amplifier and said power source;

a resistor coupled between said non-inverting input of said first operational amplifier and said one of said transmission lines, wherein said capacitor and said resistor provide a second control loop for maintaining an approximately constant direct current voltage across said transistor;

a means for producing an offset voltage associated with either said non-inverting or said inverting input of said first operational amplifier for setting up quiescent direct current voltage across said transistor;

a second operational amplifier having a non-inverting input and an inverting input;

a second transistor having a gate coupled to an output of said second operational amplifier, a drain coupled to the other of said first and said second transmission lines, and a source coupled to said inverting input of said second operational amplifier, wherein a third control loop provides an alternating current impedance between said power source and said one of said transmission lines;

a second resistor coupled between said non-inverting input of said first operational amplifier and said power source;

a third resistor coupled between said source of said second transistor and said power source;

a second capacitor coupled between said non-inverting input of said second operational amplifier and said power source; and a fourth resistor coupled between said non-inverting input of said second operational amplifier and said one of said transmission lines, wherein said second capacitor and said fourth resistor provide a fourth control loop for maintaining an approximately constant direct current voltage across said second transistor.

11. The source power coupler of claim 10 further comprising:

a means for generating a delay to allow said power source to attain full output voltage during power-up;

a current limit means for safeguarding said source power coupler when one of said transmission lines is short circuited to ground;

a means for reactivating a power startup sequence if an input voltage falls substantially below a normal input voltage level;

a synchronization means for synchronizing power startup sequences associated with a plurality of source power couplers.

12. The source power coupler of claim 11, wherein said first transistor and said second transistor are field effect transistors.

13. The source power coupler of claim 11, wherein said first transistor and said second transistor are bipolar transistors.

* * * * *

UNITED STATES PATENT AND TRADEMARK OFFICE
CERTIFICATE OF CORRECTION

PATENT NO. : 5,491,402
DATED : February 13, 1996
INVENTOR(S) : Kenneth T. Small

It is certified that error appears in the above-indentified patent and that said Letters Patent is hereby corrected as shown below:

In column 8 at line 8 delete "couples" and insert --coupler's--

Signed and Sealed this

Thirtieth Day of September, 1997

Attest:

BRUCE LEHMAN

Attesting Officer

Commissioner of Patents and Trademarks